(12) United States Patent
Johnson et al.

(10) Patent No.: US 10,496,164 B2
(45) Date of Patent: Dec. 3, 2019

(54) ELECTRONIC DEVICE WITH ADJUSTABLE REFLECTIVE DISPLAY

(71) Applicant: Apple Inc., Cupertino, CA (US)

(72) Inventors: Paul V. Johnson, San Francisco, CA (US); Yuan Chen, San Jose, CA (US); Bryan W. Posner, San Francisco, CA (US); Cheng Chen, San Jose, CA (US); Chia Hsuan Tai, San Jose, CA (US); Jiaying Wu, San Jose, CA (US); Robert Y. Cao, San Francisco, CA (US); Shih-Chyuan Fan Jiang, San Jose, CA (US); Shih-Wei Chang, San Jose, CA (US); Xiaokai Li, Sunnyvale, CA (US); Zhibing Ge, Los Altos, CA (US); Dinesh C. Mathew, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 15/835,046

(22) Filed: Dec. 7, 2017

(65) Prior Publication Data

US 2018/0164882 A1 Jun. 14, 2018

Related U.S. Application Data

(60) Provisional application No. 62/432,275, filed on Dec. 9, 2016.

(51) Int. Cl.
*G06F 3/01* (2006.01)
*G02F 1/1347* (2006.01)
(Continued)

(52) U.S. Cl.
CPC ............ *G06F 3/013* (2013.01); *G02F 1/0045* (2013.01); *G02F 1/0063* (2013.01);
(Continued)

(58) Field of Classification Search
CPC .......... G06F 3/013; G06F 3/01; G02F 1/1333; G02F 1/1335; G02F 1/0045; G02F 1/0063; G02F 1/13338; G02F 1/133536
See application file for complete search history.

(56) References Cited

U.S. PATENT DOCUMENTS 6,975,455 B1 * 12/2005 Kotchick ............... G02B 5/305
359/485.03
7,492,516 B2 2/2009 Takahashi et al.
(Continued)

OTHER PUBLICATIONS

Wong et al., "Folded Optics with Birefringent Reflective Polarizers", Digital Optical Technologies 2017, vol. 10335. International Society for Optics and Photonics, Jun. 26, 2017, 10 pages.
(Continued)

*Primary Examiner* — Nitin Patel
*Assistant Examiner* — Amy Onyekaba
(74) *Attorney, Agent, or Firm* — Treyz Law Group, P.C.; G. Victor Treyz; Kendall W. Abbasi

(57) ABSTRACT

An electronic device may have a display. Input-output circuitry in the electronic device may be used to gather input from a viewer of the display. The input-output circuitry may include a gaze tracking system that gathers point-of-gaze information, vergence information, and head position information, may be a biometric sensor, may be an input device such as a button or touch sensor, may capture hand gestures, and/or may gather other information. The display may include a pixel array for producing images. An adjustable reflectance and transmittance layer may overlap the pixel array. Control circuitry in the electronic device may individually adjust different areas of the adjustable reflectance and transmittance layer. The control circuitry may place each area in a reflective mirror more or in a content-displaying mode and may move the areas in response to the information.

19 Claims, 11 Drawing Sheets

(51) Int. Cl.
  *G02F 1/1335* (2006.01)
  *G02F 1/1333* (2006.01)
  *G02F 1/00* (2006.01)
(52) U.S. Cl.
  CPC ............ *G02F 1/13475* (2013.01); *G06F 3/01* (2013.01); *G02F 1/13338* (2013.01); *G02F 1/133536* (2013.01)

(56) References Cited

U.S. PATENT DOCUMENTS

| | | | |
|---|---|---|---|
| 9,310,610 B2 | 4/2016 | Border | |
| 2002/0063817 A1* | 5/2002 | Nauta | G02F 1/13362 349/65 |
| 2003/0127656 A1* | 7/2003 | Aizawa | H01L 51/5262 257/79 |
| 2004/0100598 A1* | 5/2004 | Adachi | G02F 1/133536 349/113 |
| 2004/0125430 A1* | 7/2004 | Kasajima | G02F 1/133536 359/247 |
| 2005/0088593 A1* | 4/2005 | Yamauchi | G02F 1/133555 349/114 |
| 2007/0070004 A1* | 3/2007 | Yabuta | G02F 1/1323 345/87 |
| 2013/0176512 A1* | 7/2013 | Posner | G02F 1/1333 349/33 |
| 2014/0092341 A1* | 4/2014 | Memering | G02F 1/133536 349/61 |
| 2015/0036085 A1* | 2/2015 | Chen | G02F 1/13725 349/99 |
| 2015/0049283 A1* | 2/2015 | Hwang | G02F 1/133536 349/96 |
| 2015/0131035 A1* | 5/2015 | Chen | G02B 5/305 349/96 |
| 2016/0085102 A1 | 3/2016 | Ohmuro et al. | |
| 2016/0197309 A1* | 7/2016 | Drolet | H01L 51/5281 257/40 |
| 2017/0031157 A1 | 2/2017 | Koito et al. | |
| 2018/0284506 A1* | 10/2018 | Tsuda | G02F 1/133536 |

OTHER PUBLICATIONS

Jones et al., "Achieving Eye Contact in a One-to-Many 3D Video Teleconferencing System", ACM Transactions on Graphics (TOG) 28.3 (2009): 64, 8 pages.

* cited by examiner

ELECTRONIC DEVICE WITH ADJUSTABLE REFLECTIVE DISPLAY

This application claims the benefit of provisional patent application No. 62/432,275, filed Dec. 9, 2016, which is hereby incorporated by reference herein in its entirety.

BACKGROUND

This relates generally to electronic devices and, more particularly, to electronic devices with displays.

Devices such as computer monitors and televisions contain arrays of pixels for displaying images for a user. Displays such as these generally exhibit low reflectivity and are unsuitable for applications involving high reflectance, adjustable reflectance capabilities, and other adjustable features.

SUMMARY

An electronic device may have a display. Input-output circuitry in the electronic device may be used to gather input from a viewer of the display. The input-output circuitry may include a gaze tracking system that gathers point-of-gaze information, vergence information, and head position information, may be a biometric sensor, may be an input device such as a button or touch sensor, may capture hand gestures, and/or may gather other information. This information may be used by control circuitry in the electronic device to dynamically adjust the display.

The display may include a pixel array for producing images. An adjustable reflectance and transmittance layer may overlap the pixel array. The adjustable reflectance and transmittance layer may have a linear polarizer, reflective polarizers, an adjustable liquid crystal layer for controlling polarization rotation, and a switchable polarizer. The switchable polarizer may include liquid crystal molecules and dichroic dye molecules.

Control circuitry in the electronic device may individually adjust different areas of the adjustable reflectance and transmittance layer by supplying control signals to the adjustable liquid crystal layer and to the switchable polarizer in each of these areas. The control circuitry may place each area in a reflective mirror mode or in a content-displaying mode. The locations of mirror mode regions and content-displaying regions may be moved with respect to each other in response to information from the input-output circuitry.

DETAILED DESCRIPTION

Electronic devices may be provided with reflective displays. Input-output circuitry may be incorporated into the devices to gather point-of-gaze information, head position information, and other input. A reflective display may include one or more layers that provide some or all of the surface of the display with an elevated reflectivity. If desired, adjustable reflectivity and transmittance regions may be provided on a reflective display so that some portions of a display may be dynamically rendered reflective while other portions of the display are rendered non-reflective and are used to display content for a user. Control circuitry may dynamically rearrange the locations of the reflective and non-reflective portions based on input from the input-output circuitry.

Figure 1:
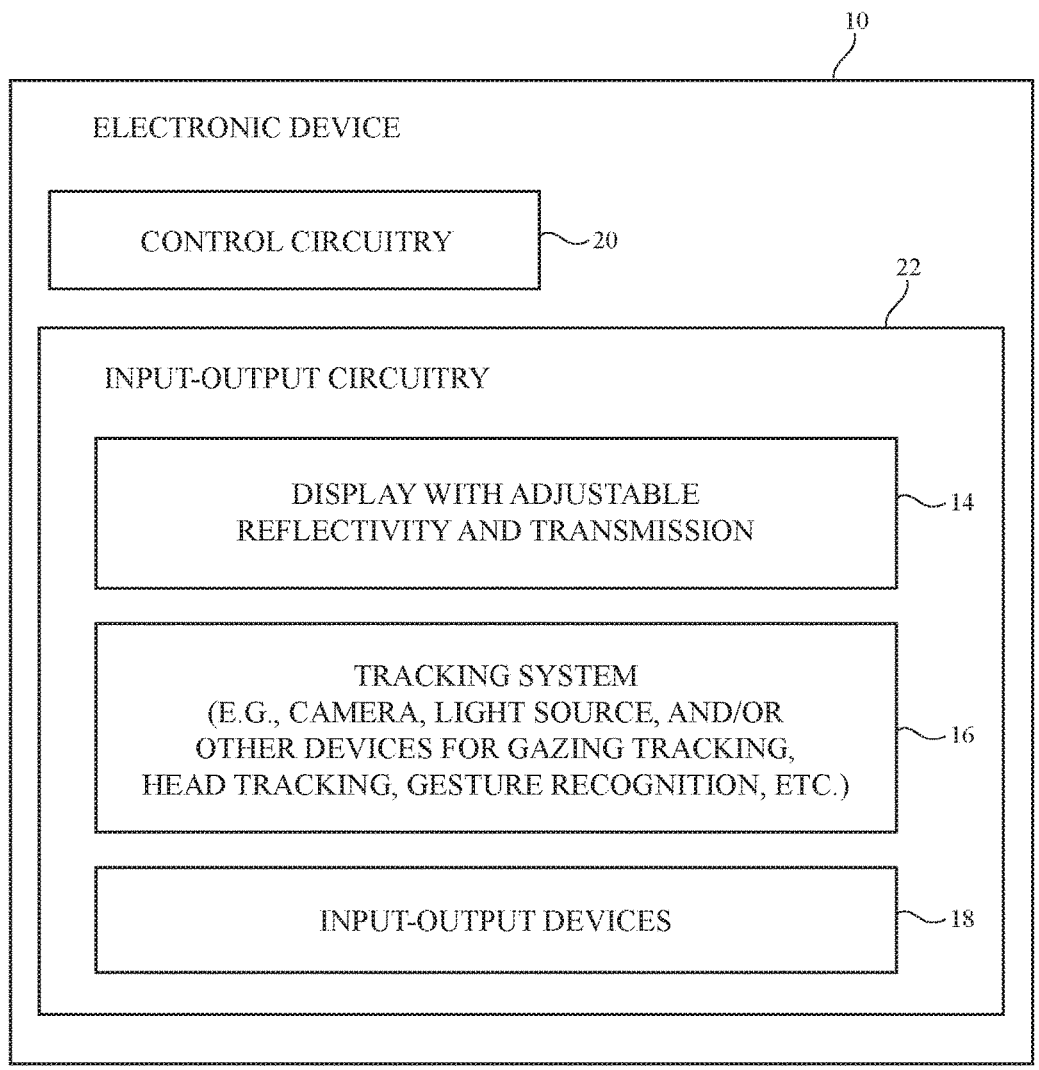
FIG. 1 is a schematic diagram of an illustrative electronic device with a display in accordance with an embodiment.

An illustrative electronic device of the type that may be provided with a reflective display is shown in FIG. 1. Electronic device 10 may be a cellular telephone, a tablet computer, a laptop, desktop computer, or wall mounted computer, a television, a wrist watch, or other electronic equipment that includes a display. As shown in FIG. 1, electronic device 10 may have control circuitry 20. Control circuitry 20 may include storage and processing circuitry for controlling the operation of device 10. Circuitry 20 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 20 may be based on one or more microprocessors, microcontrollers, digital signal processors, baseband processors, power management units, audio chips, graphics processing units, application specific integrated circuits, and other integrated circuits. Software code may be stored on storage in circuitry 20 and run on processing circuitry in circuitry 20 to implement control operations for device 10 (e.g., operations involving gathering data using sensors and user input devices, operations involving the adjustment of displays and other components using control signals based on gathered data and other information, operations associated with gathering and producing content for displaying to a user, etc.).

Device 10 may include input-output circuitry 22. Input-output circuitry 22 and/or control circuitry 20 may include communications circuitry such as wired and/or wireless communications circuitry. The communications circuitry in device 10 may be used to allow data to be received by device 10 from external equipment (e.g., a computer, a portable device such as a handheld device or laptop computer, a server or other computer coupled to the internet or a local area network, a wristwatch device or other wearable device, or other electrical equipment). The communications circuitry in device 10 may also be used to transmit data from device 10 to a computer, portable device, or other external equipment. During operation, input-output circuitry 22 may be used to gather information on the environment in which device 10 is operating. Output components in circuitry 22 may allow device 10 to provide a user with output and may be used to communicate with external electrical equipment.

As shown in FIG. 1, input-output circuitry 22 may include a display such as display 14. Display 14 may be used to display images for a user of device 10. Display 14 may be an organic light-emitting diode display, a liquid crystal display, a liquid-crystal-on-silicon display, or any other suitable display. Display 14 may be a reflective display that reflects ambient light and therefore provides display 14 or part of display 14 with a mirror-like appearance. If desired, display 14 may include adjustable reflectance and transmittance layer(s) that can be adjusted dynamically to alter the amount of ambient light that is reflected by display 14 (e.g., the reflectivity of display 14) and that can be adjusted dynamically to exhibit varying amounts of transparency. The adjustable reflectivity and transmission structures in display 14 may be adjusted dynamically by control circuitry 20 in one or more areas of display 14. For example, display 14 may include a segmented (pixelated) dynamically adjustable reflectance and transmittance layer. During operation, control circuitry 20 can supply control signals to each segmented region of the adjustable reflectance of transmittance layer to independently adjust the reflectance and transmittance levels for that region. In this way, reflective and non-reflective areas of display 14 may be moved relative to each other on display 14.

Input-output circuitry 22 may include components that form one or more tracking systems such as tracking system 16. System 16 may include one or more cameras (visible light cameras, infrared cameras, etc.), may include one or more light sources (e.g., light-emitting diodes, lasers, lamps, or other sources of light that produce glints on a user's eye for eye tracking), may include proximity sensors (e.g., capacitive proximity sensors, light-based proximity sensors, etc.), and may include other input-output devices. These components may be used to form a gaze tracking system (e.g., a system that emits spots of light that reflect from a viewer's eyes and that uses images from a camera to detect a point-of-gaze for each of the viewer's eyes).

A gaze tracking (eye monitoring) system for device 10 may, for example, include image sensors, light sources, and/or other equipment that is used in monitoring the eyes of the viewer. This system may include one or more visible and/or infrared cameras that face a viewer's eyes and capture images of the viewer's (user's) eyes. During operation of device 10, control circuitry 20 may use the gaze tracking system to track a viewer's gaze. Cameras and/or other sensors in system 16 may, for example, determine the location of a viewer's eyes (e.g., the centers of the viewer's pupils) and may determine the direction in which the viewer's eyes are oriented (the direction of the viewer's gaze, sometimes referred to as the viewer's point of gaze).

Eye orientation for the viewer's right and left eyes may be analyzed to obtain vergence information (information on the amount by which both of the viewer's eyes rotate towards or away from each other as the viewer is focusing on a near or far object). Measured vergence information may be used in addition to information on the viewer's overall direction of view to determine the viewer's point-of-gaze in three dimensions. For example, if the viewer's eyes are both pointed to the right and if vergence information reveals that the viewer is focusing on an object three feet away, tracking system 16 can conclude that the viewer's point-of-gaze is directed towards an object to the right that is three feet from the viewer's eyes. If desired, system 16 may capture additional types of eye data. For example, information on eye movements such as fixations and saccades may be gathered by system 16. System 16 may also gather information on viewer pupil size and blink rate and/or other eye parameters.

Head position information may be obtained by measuring eye position (e.g., system 16 may serve both as a gaze tracking and head tracking system). Configurations in which head tracking and gaze tracking operations are performed using different components and/or different processors may also be used. Because system 16 may be used for tracking viewer attributes such as point-of-gaze, eye location, vergence, pupil size, blink rate, eye movement information such as information on fixations and saccades, head position, and viewer hand motions, system 16 may sometimes be referred to as a viewer (user) tracking system.

By processing information from tracking system 16, system 10 may make adjustments to display 14 that affect the appearance of display 14 (e.g., the ambient light reflectance of one or more portions of display 14, the transmittance for images in one or more portions of display 14, the content displayed in one or more portions of display 14, etc.). Information from system 16 on the location on display 14 where a viewer's gaze is currently directed and the amount of time that the viewer dwells on particular on-screen items may be used as a form of user input (viewer input) to system 10. Other eye information (information on vergence, pupil size, blink rate, eye movement information such as information on fixations and saccades, etc.), and/or other eye information gathered with system 16 may also be used in controlling the operation of device 10. In some arrangement, gaze tracking system output may be used in conjunction with mouse clicks, screen taps and other touch screen or track pad touch gestures, voice commands, video game controller commands, and/or other user commands as a form of user input to device 10.

User input and other information may be gathered using sensors and other input devices in input-output devices 18. Input-output devices 18 may include, for example, position and motion sensors (e.g., compasses, gyroscopes, accelerometers, and/or other devices for monitoring the location, orientation, and movement of device 10), may include force sensors, temperature sensors, touch sensors, buttons, capacitive proximity sensors, light-based proximity sensors, other proximity sensors, strain gauges, gas sensors, pressure sensors, moisture sensors, magnetic sensors, and other sensors, may include audio components such as microphones for gathering voice commands and other audio input, and may include speakers for providing audio output (e.g., for providing sound to the left and right ears of a user). If desired, input-output devices 18 may include haptic output devices (e.g., vibrating components), light-emitting diodes and other light sources, and other output components. Circuitry 22 may include wired and wireless communications circuitry that allows device 10 (e.g., control circuitry 20) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
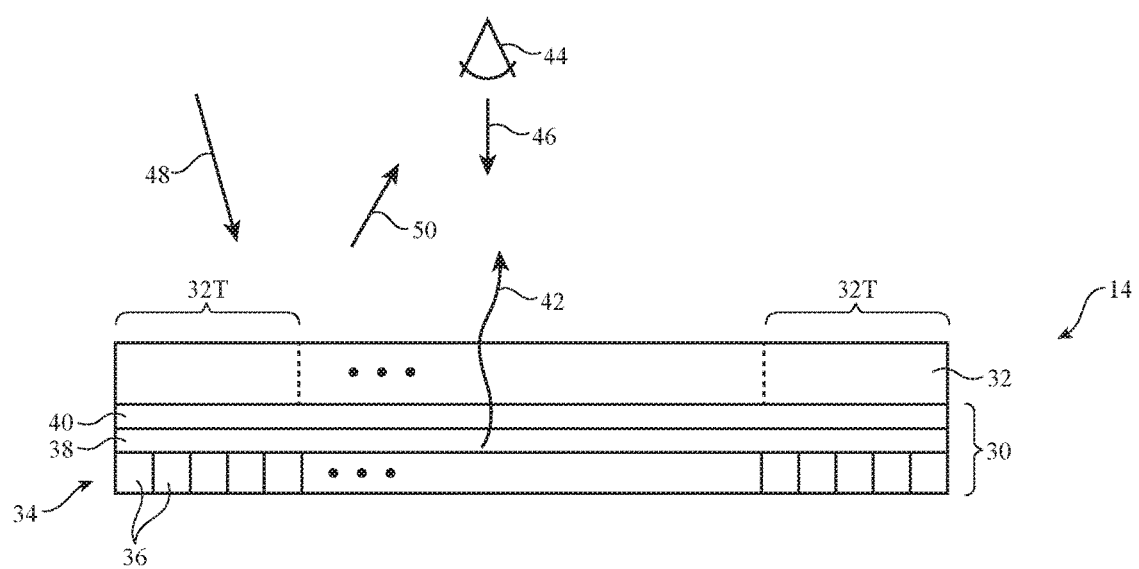
FIG. 2 is a cross-sectional side view of an illustrative display having a pixel array covered with an adjustable reflectance and transmittance layer in accordance with an embodiment.

FIG. 2 is a cross-sectional side view of display 14 in an illustrative configuration in which display 14 is has structures that allow display 14 to exhibit desired optical properties (e.g., a desired reflectance, desired transmittance, etc.). As shown in FIG. 2, display 14 may include display layers 30 and adjustable reflectance and transmittance layer (structures) 32. Display layers 30 may include an array 34 of pixels 36. Pixel array 34 may be, for example, an array of organic light-emitting diode pixels, an array of liquid crystal display pixels, or other suitable pixels for displaying images (output light 42) to a user such as viewer 44 who is viewing display 14 in direction 46.

Display layers 30 may include one or more layers on top of pixel array 34 such as layers 38 and 40. Layer 40 may be, for example, a linear polarizer. Linear polarizer 40, which may sometimes be referred to as forming a portion of layers 32, may pass light with a first polarization orientation while blocking light with a perpendicular second polarization orientation.

In a liquid crystal display configuration for display 14, layer 40 may be an upper polarizer in the liquid crystal display portion of display 14. The liquid crystal display portion of display 14 may have an opposing lower polarizer and may have a color filter layer and a thin-film transistor layer that are sandwiched between the upper and lower polarizers. A liquid crystal layer may be interposed between the color filter layer and thin-film transistor layer. In this type of arrangement, layer 38 may be omitted. In an organic light-emitting-diode display configuration for display 14, layer 40 may be a linear polarizer and layer 38 may be a quarter wave plate, so that layer 40 and layer 38 form a circular polarizer that helps suppress reflections of ambient light from reflective structures in pixel array 34. If desired, layer 38 may be omitted, layers of adhesive (e.g., pressure sensitive adhesive, liquid adhesive, etc.) and/or other materials may be incorporated into layers 30 (e.g., between layers 40 and 38, between layers 38 and/or 40 and pixel array 34, above layer 40, etc.), and/or other structures may be incorporated into display 14 (e.g., in layer 30 and/or above layer 30).

Layer 32 may include structures such as reflective polarizers, an adjustable liquid crystal layer (adjustable liquid crystal cell) for adjusting the polarization rotation properties of layer 32, an adjustable polarizer, and/or other structures for adjusting the reflectance (and light transmission) properties of display 14. Sections (areas) of layer 32 such as sections 32T may be individually adjusted. Each section 32T may have electrodes that receive control signals from control circuitry 20. During operation, control circuitry 20 may adjust the reflectance and light-transmission properties of each section 32T by supplying that portion of layer 32 with respective control signals. The reflectance and light transmission sections 32T may be adjusted in tandem or may be adjusted separately (e.g., so that each of multiple sections 32T of polarizer 32 exhibits a potentially different reflectance and transmittance).

By adjusting pixel array 34, control circuitry 20 can display desired images on display 14 for viewer 44. By adjusting layer 32, control circuitry 20 can place a selected area of display 14 (e.g., the area overlapping displayed images) in a highly transparent state for emitted image light to allow viewer 44 to view light 42 emitted from pixel array 34 associated with desired images content while placing another area of display 14 (e.g., the area not overlapping the displayed images) in a reflective state for ambient light so that this area of display 14 will have a mirror appearance for viewer 44 (e.g., so that ambient light 48 will reflect towards viewer 44 as reflected light 50). If desired, control circuitry 20 can place some or all of display 14 in an intermediate (partially reflective state) by supplying one or more sections of layer 32 with appropriate control signals.

Figure 3:
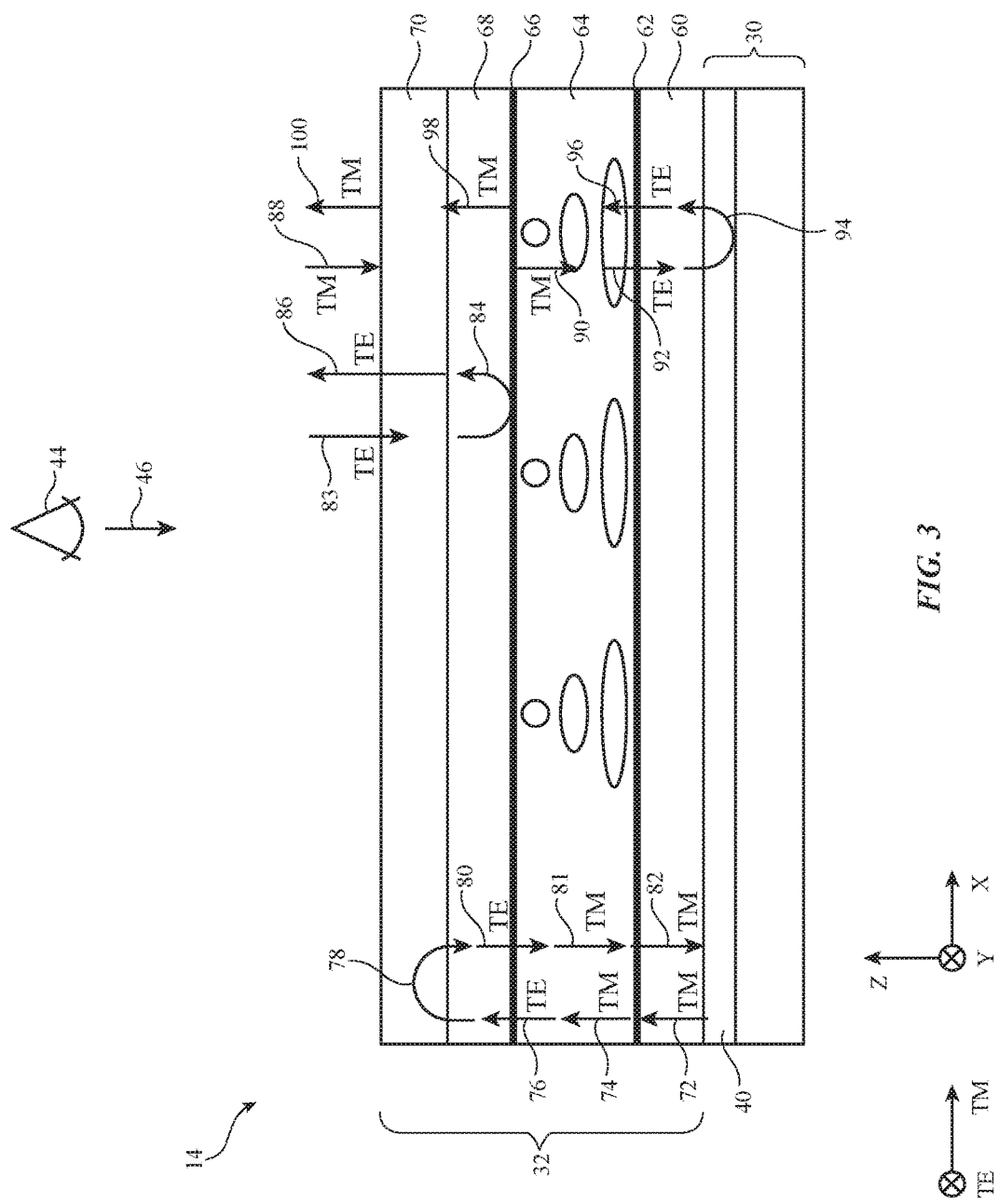
FIG. 3 is a cross-sectional side view of an illustrative adjustable reflectance and transmittance layer in a first operating mode such as a reflective mode of operation in accordance with an embodiment.
Figure 4:
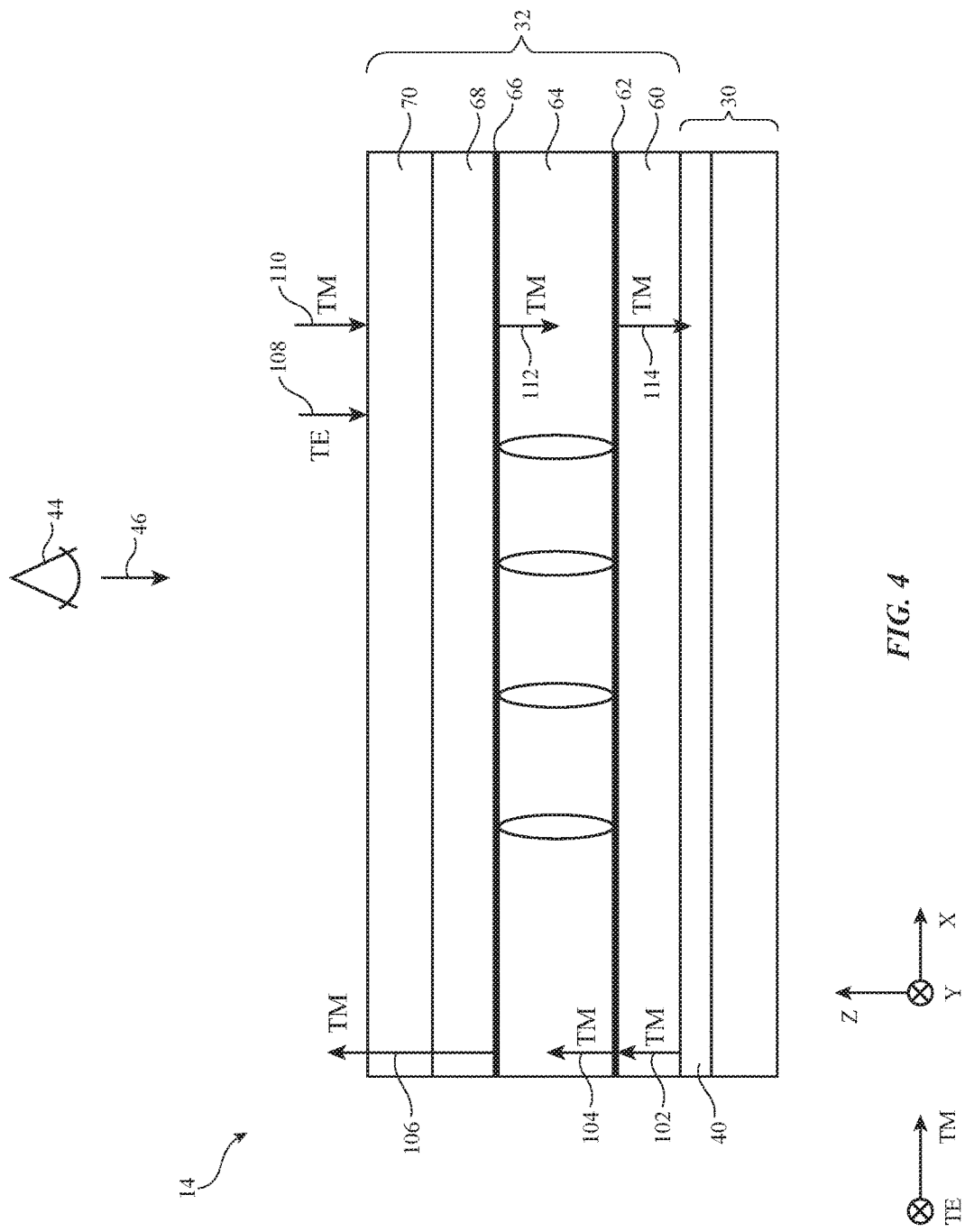
FIG. 4 is a cross-sectional side view of the adjustable reflectance and transmittance layer of FIG. 3 in a second mode of operation such as a non-reflective transparent mode of operation in accordance with an embodiment.

FIGS. 3 and 4 are cross-sectional side views of an illustrative display with an adjustable reflectance and transmittance layer. As shown in FIG. 3, adjustable reflectance and transmittance layer 32 may include liquid crystal layer 64. Layer 64 may be interposed between transparent electrodes 62 and 66 and may form an adjustable twisted nematic liquid crystal cell. By adjusting the voltages of the signals applied by control circuitry 20 to electrodes 62 and 66, the amount of rotation of the liquid crystals in layer 64 and therefore the amount of polarization rotation imparted on light traversing layer 64 can be controlled. Electrodes 62 and 66 may be formed from transparent conductive material such as indium tin oxide. Electrode 62 may be formed on layer 60 or other suitable substrate. Electrode 66 may be formed on layer 68 or other suitable substrate. Adjustable (switchable) polarizer 70 may be formed on top of layer 68, so that layer 68 is interposed between layer 64 and polarizer 70.

In the examples of FIGS. 3 and 4, light that is linearly polarized with its electric field oriented parallel to the X axis may be referred to as TM light. Light that is linearly polarized with its electric field oriented parallel to the Y axis (perpendicular to the X axis) may be referred to as TE light.

In layer 30, linear polarizer 40 may have a pass axis that is aligned with the X axis (e.g., the pixel array and other layers of layer 30 may emit image formed from TM polarized light). Reflective polarizers 60 and 68 transmit light that is polarized along a given lateral dimension while reflecting perpendicularly polarized light. In the example of FIGS. 3 and 4, reflective polarizer 60 may have a pass axis that is aligned with the X axis and reflective polarizer 68 may have a pass axis that is aligned with the X axis. As a result, reflective polarizers 60 and 68 may reflect TE polarized light and may transmit TM polarized light. Switchable polarizer 70 may have be operable in a first state (sometimes referred to as an off mode) in which polarizer 70 is transparent (transmittance is about 100%) and may be operable in a second state (sometimes referred to as an on mode) in which polarizer 70 transmits TM light (transmittance for TM is about 100%) and absorbs TE light (absorption is about 100%).

FIG. 3 illustrates operation of layer 32 in a state in which layer 32 is opaque (transmittance to emitted image light is about zero) and in which layer 32 exhibits a mirror appearance (reflectance of ambient light is about 100%). In this reflective non-transparent state, which may sometimes be referred to as a mirror state, the liquid crystal cell formed from layer 64 is placed in an off state by control circuitry 20. In this off state, layer 64 rotates TM light to TE light as the light passes through layer 64. In the configuration of FIG. 3, switchable polarizer 70 is placed in an off state by control circuitry 20. When switchable polarizer 70 is in its off state, polarizer 70 is transparent to both TE and TM light.

As shown in FIG. 3, light 72 that is emitted from the pixels of layer 30 may be linearly polarized upon passing through linear polarizer 40. In particular, light 72 may exhibit a TM polarization. TM light 72 may travel outwards towards viewer 44 (upwards in the orientation of FIG. 3) through reflective polarizer 60, because light 72 is polarized in alignment with the pass axis of reflective polarizer 60. Liquid crystal layer 64 is in its off state (e.g., applied voltage across electrodes 62 and 66 may be 0 volts), so light 72 is rotated from a TM polarization upon entering layer 64 to a TE polarization upon exiting layer 64, as illustrated by TM light ray 74 and TE light ray 76. TE polarized light 76 is reflected downwards as TE polarized light 80 by polarizer 68, as illustrated by light ray 78, because the reflective polarizer 68 is configured to reflect TE polarized light. Light 81 that passes through layer 64 is rotated from TE polarization upon entering layer 64 as light 80 to TM polarized light upon exiting layer 64 as light 82. Because light 82 is TM polarized, light 82 is absorbed by polarizer 40. Emitted image light from the pixels of layer 30 is therefore not emitted from display 14, because layer 32 is opaque to emitted light and has a low (zero) transmittance for polarized emitted light 72.

At the same time, layer 30 may be highly reflective to ambient light (e.g., light in the environment surrounding viewer 44 including light from an illuminated face or other body part of viewer 44). Ambient light may contain both TE and TM polarized light. Ambient light with a TE polarization such as ambient light 83 may pass through switchable polarizer 70 and may be reflected by reflective polarizer 68, as illustrated by TE light 84 and 86 of FIG. 3. Ambient light with a TM polarization such as ambient light 88, may pass through layer 70 (which is in a transparent state), as illustrated by TM light 90. As TM light 90 passes through layer 64, this light is rotated in polarization by 90° and becomes TE polarized, as illustrated by TE light 92. Light 92 may be reflected by reflective polarizer 60 to form TE polarized light 96, as illustrated by light 94. Upon passing through layer 64 in the upwards (+Z) direction of FIG. 3, the polarization of light 96 may be rotated from TE to TM, as illustrated by TM light 98. Because light 98 is TM polarized, light 98 may pass through reflective polarizer 68. Light 98 may pass through switchable polarizer 70 and may exit display 14 as reflected TM light 100, because polarizer 70 is in its off (no absorption) state in the configuration of FIG. 3.

As the example of FIG. 3 demonstrates, control circuitry 20 may apply control signals to layer 64 and layer 70 that place layer 64 in a polarization rotating state and that place layer 70 in a non-absorbing state, thereby causing layer 32 to block emitted light from the pixel array of layer 30 and to reflect ambient light. The region of display 14 that is shown in FIG. 3 will therefore not emit any image light from layers 30 and will have a mirror appearance to viewer 44 (e.g., a reflection of viewer 44 and the environment surrounding viewer 44 will be visible to viewer 44 on display 14). Portions of display 14 that are configured in this way may sometimes be referred to as operating in a mirror mode.

FIG. 4 illustrates operation of layer 32 in a mode of operation in which layer 32 is a transparent non-reflective state (transmittance to emitted light is about 100% and reflectance of ambient light is about 0%). In the configuration of FIG. 4, switchable polarizer 70 is placed in an on state by control circuitry 20. In the on state, polarizer 70 is transparent to TM light but absorbs and thereby blocks TE light.

In this mode of operation, which is illustrated in FIG. 4, the liquid crystal cell formed from layer 64 is placed in an on state by control circuitry 20 (the voltage across electrodes 62 and 66 is at an appropriate non-zero level to rotate the liquid crystals of layer 64 into alignment with the Z axis). In the on state, layer 64 allows light to pass without imparting a 90° polarization rotation (light polarization is unchanged upon traversing layer 64). Light 102 that is emitted from layer 30 with a TM polarization passes through reflective polarizer 60 and through liquid crystal layer 64 as TM light 104. After passing through layer 64, this light passes through layer 68 and layer 70, as illustrated by TM light 106. Viewer 44 may view emitted image light such as light 106.

Ambient TE light 108 is absorbed by switchable polarizer 70, which is in its on (TE absorbing) state. Ambient TM light 110 passes through polarizer 70 and reflective polarizer 68 and, as illustrated by TM light 112 and 114, traverses layer 64 without being rotated in polarization. TM light 114 that exits layer 64 and enters reflective polarizer 60 is transmitted through polarizer 60 and is absorbed in layer 30 (e.g., by black masking layer structures and other non-reflecting display structures in layer 30).

Figure 5:
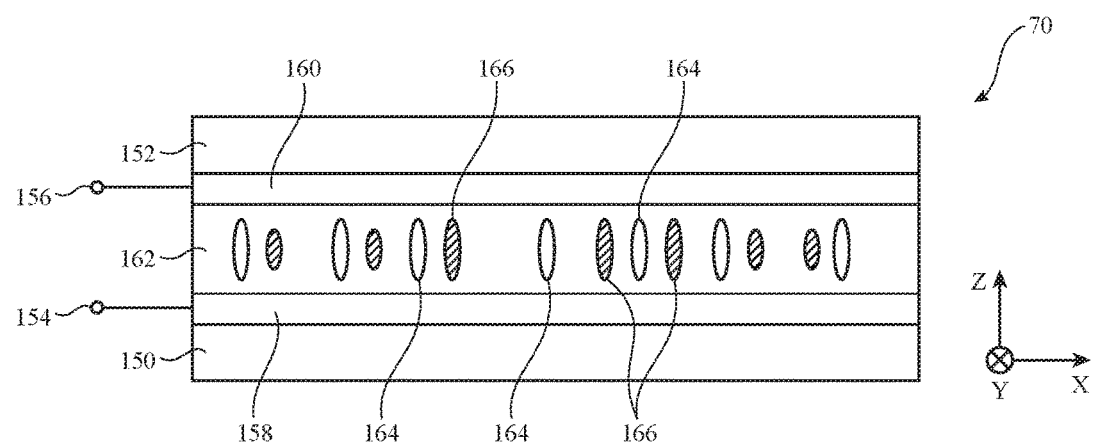
FIG. 5 is a cross-sectional side view of an illustrative adjustable polarizer in accordance with an embodiment.

A cross-sectional side view of an illustrative switchable polarizer such as polarizer 70 of FIGS. 3 and 4 is shown in FIG. 5. As shown in FIG. 5, polarizer 70 may have a guest-host liquid crystal layer such as layer 162 sandwiched between a pair of opposing transparent conductive electrodes (e.g., indium tin oxide electrodes) such as electrodes 158 and 160. Electrodes 158 and 160 may be formed on transparent substrates such as substrates 150 and 152 (e.g., glass, plastic, etc.). Control circuitry 20 may supply control signals (e.g., control voltages) to electrodes 158 and 160 via respective terminals 156 and 154. Layer 162 may include liquid crystals 164 (sometimes referred to as liquid crystal molecules or host molecules) and dichroic dye 166 (sometimes referred to as guest molecules or dichroic dye molecules). The rotation of dye 166, which serves as polarizing material, tracks the rotation of liquid crystals 164. The amount of rotation of liquid crystals 164 may be controlled by the control signals from circuitry 20. The corresponding rotation of molecules 166 and the polarization state of polarizer 70 may therefore be adjusted dynamically by control circuitry 20 by applying signals to terminals 156 and 154. For example, control circuitry 20 can place polarizer 70 in an off state in which liquid crystals 164 and dye molecules 166 are oriented along the Z axis (as shown in FIG. 5) and in which polarizer 70 transmits both TE and TM light or can place polarizer 70 in an on state in which the longitudinal axes of liquid crystals 164 and dye molecules 166 are horizontally aligned (e.g., along the Y axis) so that TM light is transmitted while TE light is absorbed.

Figure 6:
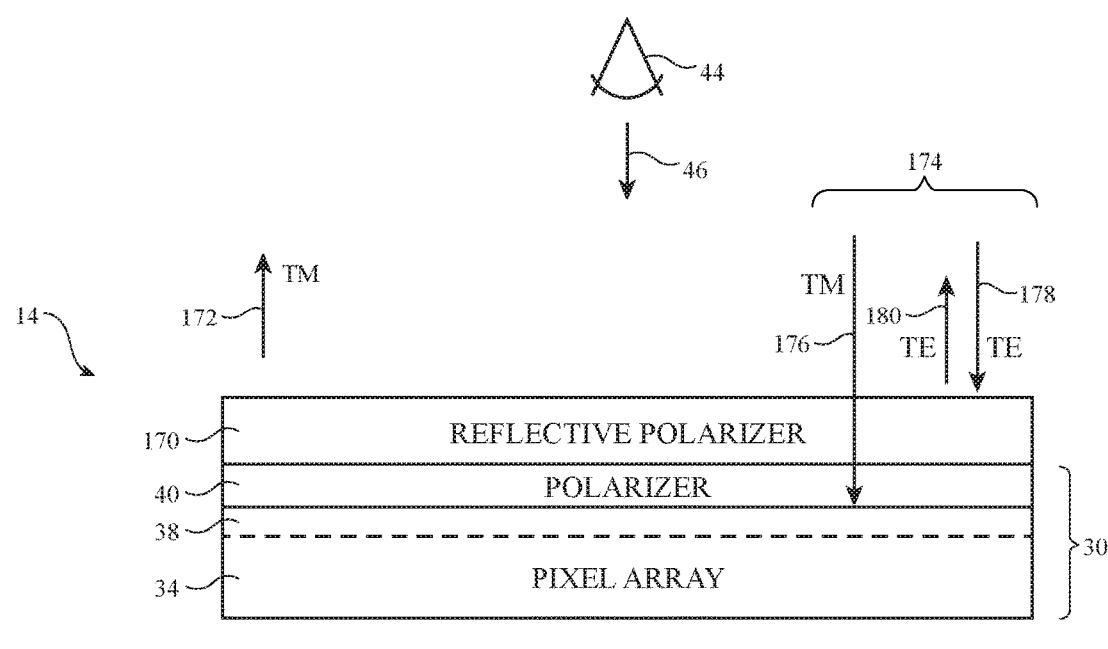
FIG. 6 is a cross-sectional side view of an illustrative reflective display with a single reflective polarizer layer in accordance with an embodiment.
Figure 6:
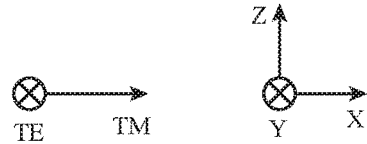

In the illustrative configuration of FIG. 6, display 14 has a reflective polarizer (e.g., a fixed reflective polarizer) such as reflective polarizer 170. Reflective polarizer 170 may be formed on top of layer 30 and may reflect light that is TE polarized. Polarizer 40 and reflective polarizer 170 may each have a pass axis aligned with the X-axis of FIG. 6. With this configuration, emitted light 172 from pixel array 34 in layer 30 that has a TM polarization may pass through polarizers 40 and 170 and may be viewed by viewer 44. Emitted light from layer 30 with TE polarization may be absorbed by polarizers 40 and 170. The transmittance of display 14 for emitted light from pixel array 34 is therefore 50%. Ambient light 174 includes TM light 176 and TE light 178. Ambient light such as TM light 176 may pass through polarizers 170 and 40 and may be absorbed by opaque masking layer structures (e.g., black masking layer material) and other opaque structures in pixel array 34. Light 176 will therefore not be reflected from display 14. Ambient light such as TE light 178 may be reflected by polarizer 170 as reflected ambient light 180. Display 14 of FIG. 6 therefore may exhibit a 50% transmission for emitted image light and a 50% (partial mirror) reflectance for ambient light.

To provide an enhance reflectance value (e.g., to an amount greater than 50%, greater than 60%, greater than 70%, or other elevated value), multiple fixed reflective polarizers may be incorporated into display 14 and may have pass axes that are oriented at non-zero angles with respect to each other. Consider, as an example, the illustrative configuration of FIG. 7. In this example, layer 30 includes linear polarizer 40 and pixel array 34. Optional quarter wave plate 38 may, if desired, be interposed between layer 34 and layer 40. Layers 200, 202, and 204 may be formed on top of polarizer 40. Layers 200 and 204 may be reflective polarizers. Layer 202 may be an adhesive layer and/or other layer(s) of clear material (e.g., polymer, polymer adhesive, etc.). Layer 202 may include, for example, pressure sensitive adhesive, cured liquid optically clear adhesive, a polymer film such as a layer of tri-acetyl cellulose (TAC) or other polymer, a TAC layer or other layer that is coated on one or both sides with pressure sensitive adhesive or other adhesive, etc.

Figure 7:
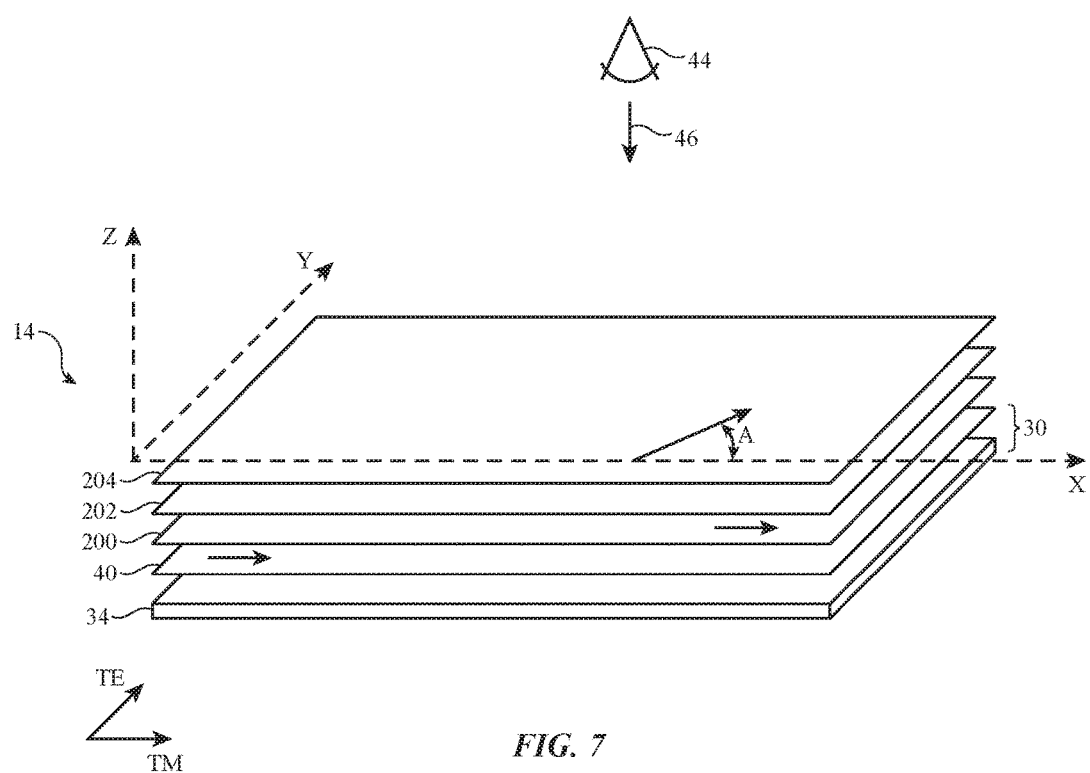
FIG. 7 is an exploded perspective view of an illustrative reflective display with multiple reflective polarizer layers in accordance with an embodiment.

Linear polarizer 40 may have a pass axis that is aligned with the X axis of FIG. 7, so that polarizer 40 passes TM polarized light and blocks TE light. Reflective polarizer 200 may also have a pass axis that is aligned parallel to the X axis. Reflective polarizer 200 may therefore pass light that has a TM polarization and may reflect TE polarized light. Layer 202 may be clear and may therefore pass light of both TM and TE polarizations. The thickness of layer 202 may be sufficient to reduce interference effects that might otherwise arise from reflections between the parallel surfaces of polarizers 200 and 204. As an example, the thickness of layer 202 may be 70-90 microns, 50-110 microns, more than 30 microns, more than 50 microns, more than 70 microns, less than 200 microns, or other suitable thickness that is sufficient to disrupt coherence and interference effects in the light that is reflected in the adhesive-filled gap between polarizers 200 and 204.

Reflective polarizer 204 may have a pass axis that is oriented at an angle A with respect to the X axis and therefore is oriented at angle A with respect to the to the pass axis of reflective polarizer 200. In a configuration in which the value of angle A is 0°, display 14 will exhibit 50% ambient light reflectance and 100% emitted light transmittance. In a configuration in which the value of angle A is 90°, display 14 will exhibit 0% transmittance for emitted light and 50% reflectance. At angles A between 0° and 90°, display 14 will exhibit enhanced emitted light transmittance and enhanced ambient light reflectance. As an example, if A is 50°, display 14 may exhibit a mirror-like ambient light reflectance level of 70% and may exhibit an emitted light transmittance of 60%. Other non-zero angles A may be used in display 14 if desired (e.g., A may be 30°-70°, more than 45°, less than 80°, or other suitable angle). Displays such as display 14 may provide a fixed mirror-like reflectivity (e.g., 70% ambient light reflectivity or other suitable elevated value) while exhibiting satisfactory light transmittance for image light emitted by the pixels of pixel array 34.

In configurations in which display 14 has multiple individually controllable areas, different portions of display 14 may dynamically be placed in either a content-displaying state or a mirror state. Consider, as an example, illustrative display 14 of FIG. 8. Display 14 may have structures of the type shown in FIG. 2 that allow portions 32T of layer 32 (and therefore display 14) to be placed in either a transparent non-reflective state in which image transmission is elevated and ambient light reflection is suppressed or a reflective non-transparent state in which image transmission is blocked and ambient light reflection is elevated.

Figure 8:
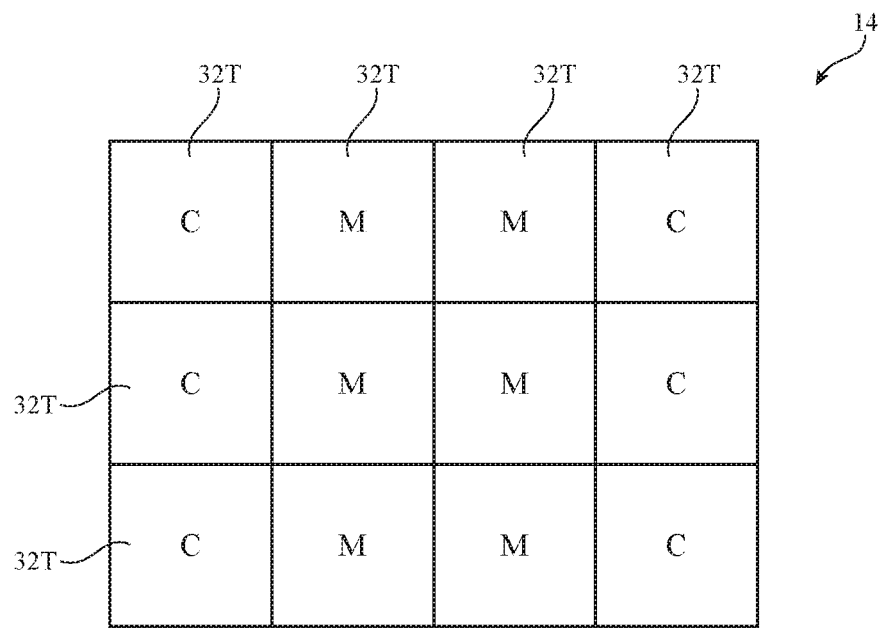
FIG. 8 is a front view of an illustrative display with independently adjustable segmented areas of varying reflectivity and transmission in accordance with an embodiment.

As shown in FIG. 8, for example, display 14 may have an array of individually adjustable areas 32T (sometimes referred to as tiles or subregions of display 14). Some areas 32T such as the areas labeled "C" in FIG. 8 may be placed in a content-displaying state and may display content for a user. The content may include, for example, text, graphics, video, still images, or other image content. Other areas 32T such as the areas labeled "M" in FIG. 8 may be placed in a mirror state. Emitted light transmission may be low in mirror mode areas M, but reflective is high, so areas M may appear to a user as if they were mirrors (e.g., no content may be displayed and only ambient light reflections may be visible).

Figure 9:
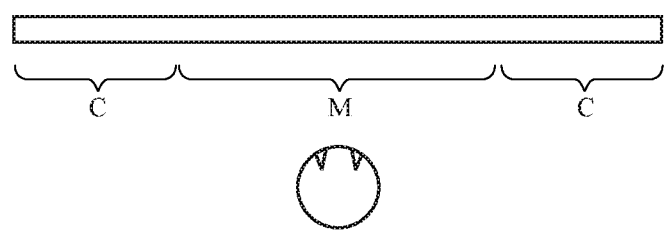
FIGS. 9 and 10 are top views of illustrative displays and an associated viewer showing how viewer head position may be measured and used in adjusting which areas of the displays are reflective and which areas of the display are non-reflective in accordance with an embodiment.
Figure 10:
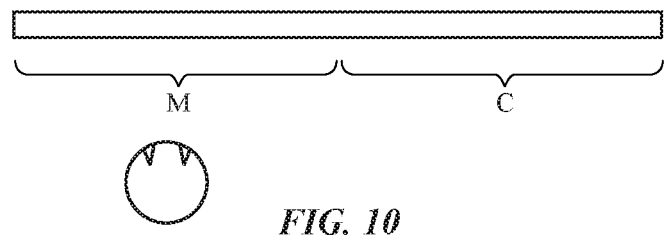

Control circuitry 20 may use information from tracking system 16 to reconfigure display 14 dynamically, as shown in the illustrative top views of display 14 in FIGS. 9 and 10. In response to detecting that viewer 44 (e.g., the head of a user) is in front of a middle section of display 14 as shown in FIG. 9, for example, control circuitry 20 may configure strips (area C) of the surface of display 14 along the left and right edges of display 14 to display content while placing the middle section in front of viewer 44 in mirror mode (mirror mode area M). In this configuration, a reflection of viewer 44 may be visible to viewer 44 in the mirror formed by mirror mode area M and text, video, and/or other images may be visible to the viewer in content-displaying area C.

When viewer 44 moves to the left side of display 14 as shown in FIG. 10, control circuitry 20 can detect the new position of viewer 44 using tracking system 16 and can dynamically reconfigure display 14 by moving mirror mode area M and content-displaying area C with respect to each other in response to the new position gathered with system 16. For example, mirror area M may be repositioned in front of the viewer's new location to ensure that the viewer's reflection is still visible to the viewer while content may be moved to only the right side of display 14 (see, e.g., content area C on the right-hand portion of display 14 in FIG. 10). In this way, control circuitry 20 may dynamically reconfigure the locations of the mirror and content-displaying portions of display 14 based on viewer position or other information from sensor systems such as tracking system 16 to ensure that the viewer's reflection is always visible to the viewer and is not obscured by the presence of non-reflective content regions. At the same time, the dynamic reconfiguration of the mirror may ensure that desired content remains visible to the user.

Figure 11:
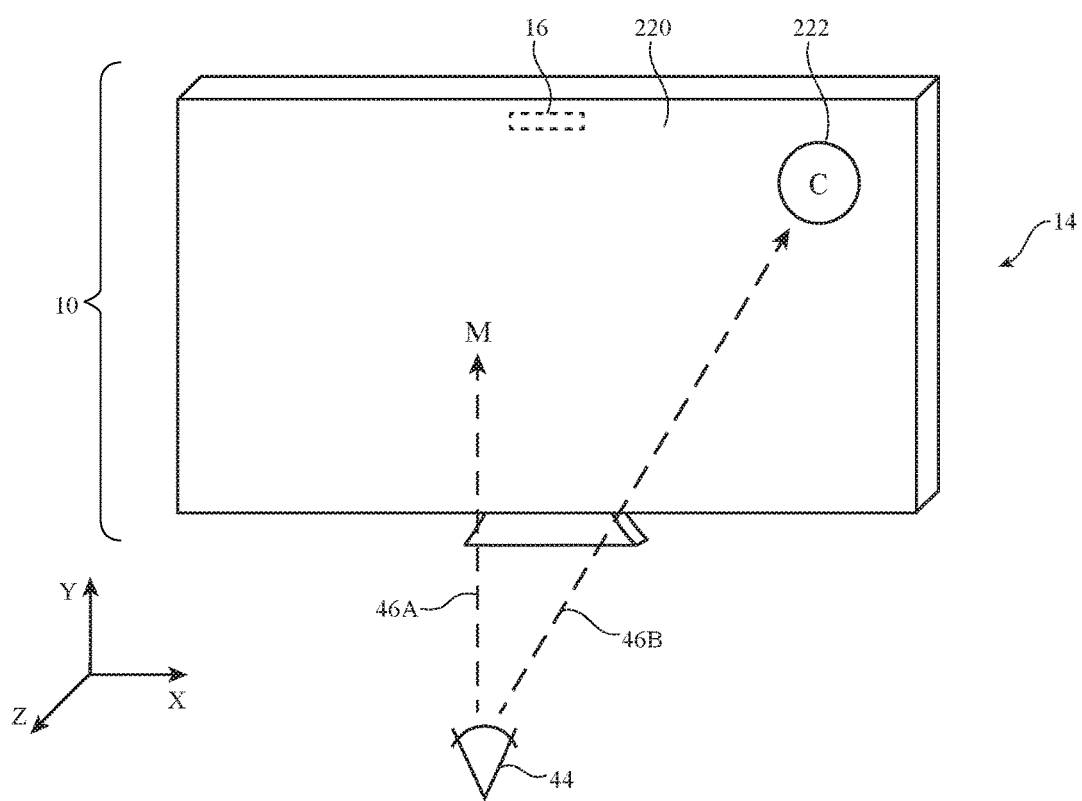
FIG. 11 is a perspective view of an illustrative display with a first area that is displaying an icon or other content and a second area that is being operated in a reflective mode while a viewer's point-of-gaze is being measured using a gaze detection system in accordance with an embodiment.

FIG. 11 is a perspective view of an illustrative electronic device with a display that is being viewed by a viewer. Tracking system 16 (e.g., a gaze tracking system) may be embedded behind a portion of display 14 or may be located elsewhere in device 10. During operation, system 16 may gather information on the viewer's point-of-gaze. Point-of-gaze information can be used in forming input commands during operation of device 10. Consider, as an example, a scenario in which portion 220 of display 14 is placed in mirror mode (see, e.g., mirror region M of FIG. 11). Mirror region M may be large and may cover most of display 14 to allow viewer reflections to be easily viewed by viewer 44. When the viewer desires to view weather, sports scores, news, calendar information, and/or other content, there may initially be insufficient content displaying area available on the surface of display 14. If the viewer desires to direct device 10 to enlarge the amount of content area on display 14, the viewer may look at an icon or other information on a particular portion of display 14. System 16 may detect that the viewer's point-of-gaze is dwelling on the icon and may take appropriate action such as enlarging the amount of area on display 14 that is used for displaying content (e.g., some of mirror region 220 may be converted into a content-displaying region).

In the example of FIG. 11, viewer 44 is looking at display 14 in two different directions. Initially, the viewer's point-of-gaze is directed towards mirror region 220 (see, e.g., point-of-gaze 46A). When the viewer's gaze is oriented in this way, a reflection of the viewer will be visible to the viewer. If the viewer desires to view content, the viewer may shift the point-of-gaze towards an icon or other information in content-displaying region 222 (see, e.g., point-of-gaze 46B). Control circuitry 20 can use information from tracking system 16 to detect when the viewer's point-of-gaze is directed towards region 222 (or other appropriate area of display 14) for more than a predetermined amount of time and can conclude that the viewer is commanding device 10 to convert some or all of mirror region M into a content-displaying region. Control circuitry 20 can then dynamically reconfigure display 14 to enlarge the content-displaying portion of display 14 relative to the mirror portion of display 14 accordingly.

Figure 12:
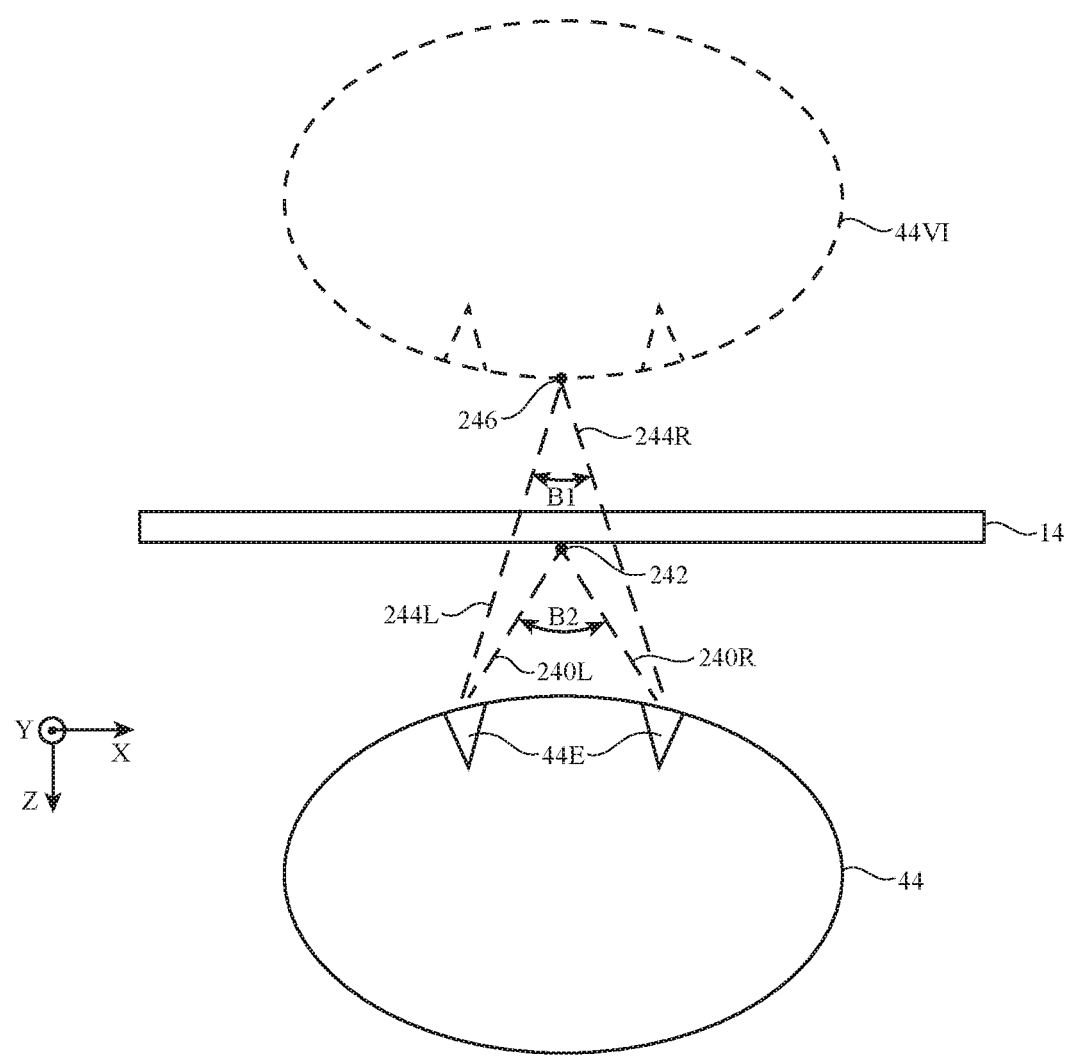
FIG. 12 is a top view of an illustrative display showing how display operation may be adjusted dynamically based on measured vergence information from a user's eyes in accordance with an embodiment.

FIG. 12 is a diagram showing how tracking system 16 can gather vergence information on viewer 44. The gathered vergence information from the eyes of viewer 44 can be used as user input (e.g., a command to dynamically reconfigure display 14 to enlarge the amount of display 14 that is used for displaying content relative to the amount of display 14 that is used as a mirror).

Vergence is the movement of eyes 44E towards or away from each other as viewer 44 looks at objects that are respectively closer or farther away from the viewer's location. Consider, as an example, a scenario in which a central portion of display 14 is in mirror mode. In this scenario, viewer 44 may be viewing a reflection of the viewer (e.g., virtual image 44VI of viewer 44) in the mirror formed by display 14. When viewing virtual image 44VI, the viewer's left eye 44E will be viewing point 246 on virtual image 44VI along viewing path 244L and the viewer's right eye 44E will be viewing point 246 on virtual image 44VI along viewing path 244R. System 16 can detect the orientation (direction of view) of each eye 44E (e.g., by using a gaze tracking system to process glint information from images of viewer eyes 44E). The orientation of each eye 44E (e.g., vergence information such as the directions of paths 244L and 244R indicating that the viewer is focusing eyes 44E on point 246 of virtual image 44VI) may be used in determining that the viewer is viewing a reflection of the viewer in the mirror portion of display 14.

While the viewer is viewing a reflection such as virtual image 44VI, the viewer may desire to invoke a more content-rich mode of operation. With one illustrative configuration, the viewer may focus on the surface of display 14 (see, e.g., point 242) to direct control circuitry 20 to display more content. System 16 may measure the resulting vergence of the viewer's eyes. For example, when a viewer is looking at point 242 (e.g., an icon or a portion of display 14, a frame associated with display 14, or other point that is located at a distance that is closer to viewer 44 than virtual image 44VI), system 16 may detect that the viewer's left eye 44E is viewing point 242 along viewing path 240L and that the viewer's right eye 44E is viewing point 242 along viewing path 240R. The vergence (angular spread B2) associated with looking at point 242 is different than the vergence (angular spread B1) associated with looking at point 246 (virtual image 44VI) and this difference can be used to sense when a viewer is no longer focusing on the viewer's reflection. In response to measured vergence of the viewer, control circuitry 20 may take actions such as displaying content over the central portion of display 14, over all of display 14, or over other portions of display 14 (e.g., the left and/or right sides of display 14), or may take other suitable action.

If desired, display 14 (e.g., pixel array 34) may be an autostereoscopic display that is capable of displaying images at multiple image planes. Display 14 may, as an example, display images at an image plane that is aligned with virtual image 44VI of viewer 44 (e.g., so that augmented reality content may be displayed in a location that is aligned with virtual image 44VI and/or that overlaps virtual image 44VI). For example, clothing templates, images of sample hairstyles, and other augmented reality images may be displayed at an image plane that is aligned with virtual image 44VI. These augmented reality items may overlap and/or be aligned with some or all of virtual image 44VI so that viewer 44 can view both the viewer's reflection and the associated augmented reality content in the same image plane. During operation, control circuitry 20 can adjust the image plane of displayed content based on vergence information from system 16 and/or other data gathered with system 16, input-output devices 18, and/or other input-output circuitry 22.

Tracking system 16 may use camera(s), proximity sensor(s), and/or other sensors to monitor viewer gestures (e.g., hand gestures or other gesture input). Gesture input may be used to direct control circuitry 20 to reconfigure the mirror and content displaying portions of display 14 and/or to perform other operations. For example, control circuitry 20 may determine with system 16 that a viewer has made a left swipe hand gesture. In response to the left swipe, content that was previously presented in a strip along the right-hand side of display 14 may be moved from right to left across display 14 and may be presented next to previously displayed content on the left-hand side of display 14. If desired, voice commands and/or other input may be gathered by circuitry 22 and used by control circuitry 20 in controlling the operation of device 10.

In general, any suitable viewer (user) input can be provided to device 10 to reconfigure display 14 and/or take other actions. The user input may be gatherer using tracking system 16, input-output devices 18, and/or other input-output circuitry 22. Viewer input may include head tracking input (e.g., information on the position of the head of viewer 44), may include gaze tracking information (e.g., information on the point-of-gaze of viewer 44, the amount of time viewer 44 maintains any given point-of-gaze, information on the speed and direction with which the viewer's point-of-gaze moves across display 14, etc.), may include vergence information, may include viewer gesture information, may include voice commands, may include button press information, key strokes, touch sensor input, proximity sensor input, etc.

System 16 may include cameras for gesture tracking, eye tracking, head position measurements, and other input gathering operations. If desired, one or more cameras in display 14 or elsewhere in device 10 may capture images of viewer 44 while viewer 44 is looking at virtual image (viewer reflection) 44VI. Control circuitry 20 may be configured to capture this type of self-portrait image ("selfie") in response to determining that the viewers head is in a particular position relative to display 14, in response to detecting that the viewer's point-of-gaze is fixed or is directed at a particular on-screen location, and/or in response to other input from input-output circuitry 22. If desired, circuitry 22 may direct circuitry 20 to capture the self-portrait image of viewer 44 in response to receipt of a wirelessly received command from a cellular telephone, remote control, or other wireless portable electronic device being held and operated by viewer 44 or other operator of device 10.

Content-displaying regions C on display 14 may be used for displaying notifications, messages, calendar events, moving and still content, content with text, content with text and embedded video, and/or other images. If desired, input-output circuitry 22 may be used to gather information on a viewer's habits (amount of movement, wake and sleep times, heart rate, etc.). Input-output circuitry 22 may include heart-rate monitoring circuitry (e.g., a camera that produces images that may be processed by circuitry 20 to extract heart rate information, a light-based heart-rate sensor with a light source and corresponding detector, etc.), information on heart rate measurements from a viewer's wristwatch may be conveyed to control circuitry 20 wirelessly, and/or other information may be used to gather information on the habits and health of a viewer (e.g., system 16 may gather statistics on a viewer's eye movements to help diagnose potential health issues, to determine whether the viewer is alert or is tired, and/or gather other viewer biometric and/or behavioral information). Display 14 may be touch sensitive (e.g., input-output circuitry 22 may include a touch sensor overlapping display 14) and may gather touch input from a viewer (e.g., a viewer may tap on displayed items of interest on display 14). Touch sensor input and/or other input from input-output circuitry 22 may be used to control home automation equipment (lights, motorized blinds, audio/video equipment, heating and air-conditioning equipment, etc.). For example, a user may provide gaze input, gesture input, voice commands, and/or other input to device 10 that is gathered using circuitry 22 and used to direct control circuitry 20 to take appropriate action (e.g., adjusting light levels, opening blinds, adjusting media playback functions, changing thermostat settings, etc.).

Figure 13:
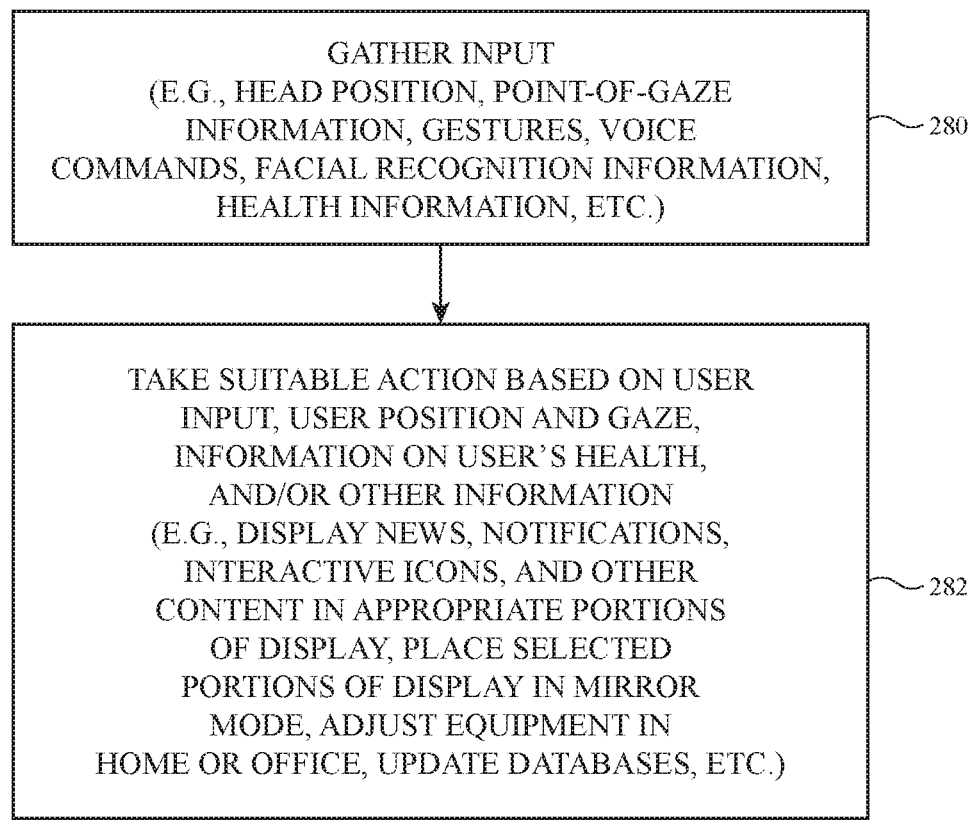
FIG. 13 is a flow chart of illustrative steps involved in operating a device of the type shown in FIG. 1 in accordance with an embodiment.

Illustrative operations involved in operating device 10 are shown in FIG. 13.

At step 280, device 10 may gather information from viewer 44. As an example, input-output circuitry 22 (e.g., tracking system 16, sensors and/or other input-output devices 18, etc.) may gather head position information, point-of-gaze information (point-of-gaze location, point-of-gaze dwell time and movement information, etc.), gestures (e.g., hand gestures), voice command input, biometric information (facial recognition information), vergence information, health information (directly measured and/or relayed heart rate measurement, respiration rate information, eye movement statistics, etc.), and/or other information on viewer 44, the operating environment of device 10 and/or other information.

Control circuitry 20 may take suitable actions based on this information at step 282. For example, control circuitry 20 may use information on the position of the head of viewer 44 to reconfigure the mirror and content-displaying portions of display 14, may use point-of-gaze information, gestures, voice commands, biometric and/or health information, button press information, vergence information, and/or other viewer input and/or environmental data to adjust which content is displayed in the content-displaying portions of display 14, to add or remove calendar entries, to adjust settings in a messaging application, to set or clear reminders, to capture self-portraits and/or other images, and/or to perform other tasks.

The foregoing is merely illustrative and various modifications can be made to the described embodiments. The foregoing embodiments may be implemented individually or in any combination.

What is claimed is:

1. An electronic device, comprising:
 a display having a pixel array configured to produce images, a linear polarizer overlapping the pixel array, and first and second reflective polarizers overlapping the linear polarizer;
 input-output circuitry that is configured to gather input; and
 control circuitry that is configured to:
  display content with the pixel array in response to the input;
  place a first area of the display in a mirror configuration that is reflective to ambient light and that blocks the images from the pixel array; and
  place a second area of the display that is different from the first area in a content-displaying configuration that is transparent to the images from the pixel array and that is not reflective to ambient light, wherein the control circuitry moves the first and second areas relative to each other on the display in response to the input.

2. The electronic device defined in claim 1, wherein the display comprises a liquid crystal layer between the first and second reflective polarizers.

3. The electronic device defined in claim 2 further comprising a pair of transparent electrodes configured to apply electric fields to the liquid crystal layer.

4. The electronic device defined in claim 3 further comprising a switchable polarizer, wherein the second reflective polarizer is interposed between the switchable polarizer and the liquid crystal layer.

5. The electronic device defined in claim 4, wherein the pair of transparent electrodes is configured to apply electric fields to the liquid crystal layer, wherein the pair of transparent electrodes, the liquid crystal layer, and the switchable polarizer have independently adjustable areas on the display that receive signals from the control circuitry that adjust ambient light reflectance and image transmittance from the pixel array in response to control signals from the control circuitry.

6. The electronic device defined in claim 2 further comprising a switchable polarizer, wherein the control circuitry is configured to adjust the switchable polarizer and the liquid crystal layer to place the first area of the display in the mirror configuration and to place the second area of the display in the content-displaying configuration.

7. The electronic device defined in claim 6, wherein the input-output circuitry comprises a head positioning tracking system and wherein the input comprises head location information.

8. The electronic device defined in claim 6, wherein the input-output circuitry comprises a gaze tracking system and wherein the input comprise point-of-gaze information.

9. The electronic device defined in claim 6, wherein the input-output circuitry comprises a hand gesture tracking system and wherein the input comprises hand gestures.

10. The electronic device defined in claim 6, wherein the input-output circuitry is configured to measure vergence information that serves as the input.

11. The electronic device defined in claim 1, wherein the first reflective polarizer has a first pass axis, wherein the second reflective polarizer has a second pass axis, and wherein the first and second pass axes are parallel to each other.

12. The electronic device defined in claim 1, wherein the first reflective polarizer has a first pass axis, wherein the second reflective polarizer has a second pass axis, and wherein the first and second pass axes are separated by an angle from 30° to 70°.

13. The electronic device defined in claim 1 further comprising a clear layer of material between the first and second reflective polarizers.

14. The electronic device defined in claim 13, wherein the clear layer of material comprises a polymer layer having a thickness of 50-110 microns.

15. An electronic device, comprising:
a display having a pixel array configured to produce images, a linear polarizer overlapping the pixel array, a first reflective polarizer, a second reflective polarizer, an adjustable liquid crystal layer between the first and second reflective polarizers, and an adjustable polarizer, wherein the second reflective polarizer is between the adjustable liquid crystal layer and the adjustable polarizer;
a tracking system that gathers input; and
control circuitry that is configured to:
place a first portion of the display in a content-displaying mode in which ambient light reflectance is reduced and content is displayed with the pixel array;
place a second portion of the display in a mirror mode in which display ambient light reflectance is enhanced; and
adjust where the first and second portions are located on the display in response to the input.

16. The electronic device defined in claim 15, wherein the tracking system has a camera and wherein the input comprises head position information gathered with the camera.

17. The electronic device defined in claim 15, wherein the tracking system comprises a gaze tracking system and wherein the input comprises vergence information gathered with the gaze tracking system.

18. An adjustable mirror display, comprising:
a pixel array configured to produce images;
an adjustable reflectance and transmittance layer having multiple independently adjustable areas each of which operates in at least a mirror mode in which ambient light is reflected and the images are not transmitted and a content-displaying mode in which the images are transmitted for viewing and ambient light reflections are reduced relative to the mirror mode;
a tracking system that includes a camera; and
control circuitry that adjusts which of the independently adjustable areas operate in the mirror mode and which of the independently adjustable areas operate in the content-displaying mode based on information from the tracking system.

19. The adjustable mirror display defined in claim 18, wherein the adjustable reflectance and transmittance layer comprises:
a linear polarizer through which the images are transmitted;
a first reflective polarizer having a first pass axis;
a second reflective polarizer having a second pass axis that is parallel to the first pass axis;
an adjustable liquid crystal layer between the first and second reflective polarizers; and
an adjustable polarizer containing liquid crystal molecules and dichroic dye molecules and wherein the adjustable mirror display further comprises input-output circuitry that gathers biometric information.

* * * * *